United States Patent [19]

Sander et al.

[11] Patent Number: 4,828,715
[45] Date of Patent: May 9, 1989

[54] CLEANING AND DISPOSAL OF CARBON BLACK AND ASH CONTAINING WASTEWATERS

[75] Inventors: Bruno Sander, Ludwigshafen; Siegfried Marquardt, Bobenheim-Roxheim; Gero Lueth, Mannheim; Robert K. Horn, Ludwigshafen; Uwe Kempe, Dannstadt-Schauernheim, all of Fed. Rep. of Germany

[73] Assignee: BASF Aktiengesellschaft, Ludwigshafen, Fed. Rep. of Germany

[21] Appl. No.: 171,386

[22] Filed: Mar. 21, 1988

[30] Foreign Application Priority Data

Mar. 31, 1987 [DE] Fed. Rep. of Germany ....... 3710804

[51] Int. Cl.$^4$ ................................................. C02F 1/54
[52] U.S. Cl. .................................... 210/710; 210/725; 210/727; 210/751; 210/912
[58] Field of Search ............... 210/710, 725, 727, 728, 210/734, 738, 751, 768, 772, 912

[56] References Cited

U.S. PATENT DOCUMENTS

| 4,500,324 | 2/1985 | Vuong .................................. 210/727 |
| 4,728,437 | 3/1988 | Gettert et al. ....................... 210/710 |

FOREIGN PATENT DOCUMENTS

| 3528598 | 2/1987 | Fed. Rep. of Germany . |
| 50-21565 | 3/1975 | Japan .................................. 210/912 |

*Primary Examiner*—Peter Hruskoci
*Attorney, Agent, or Firm*—Keil & Weinkauf

[57] ABSTRACT

Carbon black and ash containing wastewaters from high-temperature processes in which the carbon black is present in an extremely finely divided and partly colloidal state are cleaned and disposed of by treatment with organic flocculants, predewatering of the flocculated suspension by gravity filtration and post-dewatering of the carbon black sludge by pressure filtration within the range from 0.5 to 15 bar in a process comprising adding sufficient calcium hydroxide to the wastewaters that the pH of an aqueous extract of the filter cake obtained is more than 11.8, preferably more than 12.0.

7 Claims, No Drawings

CLEANING AND DISPOSAL OF CARBON BLACK AND ASH CONTAINING WASTEWATERS

The present invention relates to a process for cleaning and disposing of carbon black and ash containing wastewaters from high-temperature processes in which the carbon black is present in an extremely finely divided and partly colloidal state.

High-temperature processes, for example the production of synthesis gas by partial oxidation of oil residues, gives rise to extremely finely divided carbon black which is chiefly removed from the process by washing the carbon black containing gas with water, giving carbon black waters having a carbon black content from 0.5 to 7%, depending on the way the process is carried out. Depending on the starting material and the process, the carbon black has an ash content from 1 to 15% by weight which generally contains the heavy metals nickel and vanadium.

Disposing of this carbon black is problematical because of the toxicity of the heavy metal compounds present. In most cases the carbon black waters cannot be passed into biological water treatment plants because of their chemical composition. Disposal of the carbon black by deposition as landfill is not possible because the heavy metals would be eluted out by water.

DE Patent Application No. 3,528,598.2 discloses admixing the carbon black containing wastewaters with calcium carbonate or hydrated lime and organic, preferably anionic, flocculants, treating the flocculated suspensions in a flow-through stirred vessel or static tube mixers, then separating off the carbon black by gravity filtration, dewatering by pressure filtration, and spraying or sprinkling the filter cakes obtained with iron salt solutions. After this treatment the filter cake conforms to requirements for depostion as landfill.

However, the required uniform spraying or sprinkling of the filter cake with iron salt solutions and accurate dosage and distribution thereof in the filter cake are very difficult to achieve. In practice, under or overdosing is a frequent occurrence which jeopardizes the landfill depositability.

In addition, the acid iron salt solutions cause substantial corrosion damage to the dewatering machines, in particular in the discharge zone of sieve belt presses, which according to the abovementioned Patent Application are preferably used for carbon black dewatering. Similarly, the conveyor belts for the filter cakes treated with iron salt show corrosion damage.

It is an object of the present invention to modify the existing process to the effect that it is possible to dispense with the complicated, problematical and (indirectly) costly treatment of the filter cake with iron salt solutions.

We have found that this object is achieved according to the invention when sufficient calcium hydroxide is added to the wastewaters so that the pH of an aqueous extract of the filter cake obtained, prepared in accordance with German Standard Specification DIN 38,414 (page 4) is more than 11.8, preferably more than 12.0.

It is surprising that by adding lime to the manner of the invention it is possible to dispense with the use of iron salts which cause expense and substantial problems. The further advantage of the process according to the invention is that the depositability requirements are consistently met.

The calcium hydroxide can be used not only in the form of an aqueous suspension but also in a solid, finely divided form.

The addition of $Ca(OH)_2$ to the carbon black water can take place before or after the addition of organic flocculant. The mixing with the carbon black water is effected by stirring in a stirred vessel. Milk of lime can also be metered directly into the carbon black water line leading to a downstream static tube mixer.

The amounts which need to be added vary with the process and the material composition of the carbon black water within the range from 1 to 10 kg of $Ca(OH)_2$ per $m^3$ of carbon black water.

In practice, the lime is advantageously added in two stages. In the first stage, the carbon black water is brought to a pH of 11.9–12.1 with the aid of measuring and regulating means and in the second stage a further 2 kg of $Ca(OH)_2$ are metered in per $m^3$ of carbon black water. This ensures a pH above 12 in the aqueous filter cake extract.

The organic flocculant used can be a commercial brand. In the process according to the invention, anionic flocculants have particularly good utility. They are used in the form of from 0.05 to 0.2% strength aqueous solutions. The amount of flocculant required is within the range from 1 to 10 g (calculated as 100%) per kg of carbon black.

The flocculant solution is directly fed into the carbon black water line and thoroughly distributed in the carbon black water in the course of from 1 to 2 seconds with the aid of mechanical means such as, for example, cone mixers or static tube mixers having a small cross-section.

The subsequent floc aging process can be carried out in an upward flow stirred vessel at stirrer speeds from 5 to 20 $min^{-1}$ in the course of from 0.5 to 3 minutes or in static tube mixers having helices or cross-sectional constrictions on the inside in the course of less than 60 seconds.

After this pretreatment the flocculated carbon black water is subjected to gravity filtration. Suitable for this purpose are endless-belt filters or sieve drums. The endless-belt filter can also be, in a preferred embodiment, the bottom belt of a sieve belt press. By gravity filtration it is possible to remove up to 88% of the water.

After this predewatering the remaining carbon black sludge is subjected to a pressure filtration within the range from 0.5 to 15 bar, preferably in a sieve belt press since the preceeding gravity filtration can also be carried out in the first process stage of the sieve belt press, namely the straining zone. The pressure filtration can also be carried out in chamber and membrane filter presses.

The continuous form of a process according to the invention is carried out in particular with sieve belt presses, since they can be used both with gravity and pressure filtration. The separation achieved on a sieve belt press amounts to not less than 90% of the carbon black to be separated off. The filter cake obtained comes away easily from the filter cloth and has a firm consistency. The solids content is in the range from 20 to 35%.

The aqueous extract produced from this filter cake in accordance with German Standard Specification DIN 38,414 (page 4) has a pH of above 12 and contains not more than 0.5 milligrams of nickel and vanadium per liter. The TTC value (triphenyltetrazolium chloride test, L3 of the German Standard Methods for Water Analysis) is above ±0%. The filter cake thus meets the requirements for deposition as landfill.

The invention is illustrated below by reference to Examples. The carbon black waters used came from a hightemperature process and contained from 1 to 6% of carbon black. The ash content of the carbon black was from 9 to 10% nickel and from 25 to 38% vanadium. The pH of the carbon black waters was around 9.

EXAMPLE 1

800 ml of carbon black water containing 1.4% of carbon black are admixed with 4.8 g of $Ca(OH)_2$ in the form of 15% strength milk of lime by stirring with a 7×7 cm blade stirrer for 30 seconds. 45 ml of a 0.1% strength solution of an organic flocculant of 20% anionic modification are then added and stirred in at a stirrer speed of 200 $min^{-1}$ for 30 seconds.

The mixture is then discharged onto a Buchner nutsche 12 cm in diameter containing a propylene weave filter cloth and is subjected to gravity filtration. The filtrate contains less than 1 mg/l of nickel and vanadium. After the filtrate flow has ceased, the filter residue is expressed under 10 bar in a laboratory ram press (filtering area 13.5×13.5 cm) between 2 polypropylene filter cloths for 2 minutes. The result is a firm, dimensionally stable filter cake having a solids content of 26%.

An aqueous extract of filter cake is then produced in accordance with German Standard Specification DIN 38,414 (page 4) by shaking 385 g of filter cake containing 100 g of dry matter with 1 l of distilled water at room temperature for 24 hours. After the solids have been separated off, the aqueous extract is analyzed in terms of pH, nickel and vanadium content and TTC value.

Results
pH: 12.7
Nickel content: 0.05 mg/l
Vanadium content: 0.5 mg/l
TTC value: +30%.

The filter cake is depositable as landfill.

COMPARISON 1

A carbon black filter cake is produced as described in Example 1, except that no $Ca(OH)_2$ is added to the carbon black water. The result is a filter cake having a solids content of 19.6%. Analysis of the aqueous extract of this filter cake gives the following results:
pH: 7.2
Nickel content: 8 mg/l
Vanadium content: 68 mg/l
TTC value: −40%.

The filter cake is not depositable as landfill because of the solubility of the heavy metals.

EXAMPLE 2

1 l of carbon black water having a carbon black content of 1.6% is admixed with 50 ml of an organic flocculant of 20% anionic modification by stirring with a 7×7 cm blade stirrer for 30 seconds. 4 g of $Ca(OH)_2$ are then added in powder form and stirred in for 30 seconds. The suspension is then discharged onto a Buchner nutsche and treated for the remainder as described in Example 1.

A filter cake having a solids content of 23% is obtained. An aqueous extract of this filter cake gives the following analytical values:
pH: 12.4
Nickel content: 0.05 mg/l
Vanadium content: 0.5 mg/l
TTC value: +50%.

The filter cake is depositable as landfill.

COMPARISON 2

A carbon black filter cake is produced as described in Example 2, except that no $Ca(OH)_2$ is added to the flocculated carbon black water, affording a filter cake having a solids content of 20%. Analysis of an aqueous extract of this filter cake reveals the following:
pH: 7.8
Nickel content: 18 mg/l
Vanadium content: 87 mg/l
TTC value: +0%.

The filter cake is not depositable as landfill on account of the elutable nickel and vanadium compounds.

EXAMPLE 3

800 ml of carbon black water having a carbon black content of 5.2% are admixed with 6 g of pulverulant $Ca(OH)_2$ by stirring with a 7×7 cm blade stirrer at 450 $min^{-1}$ for 15 minutes. 125 ml of a 0.1% strength solution of an organic flocculant of 20% anionic modification are then added and stirred in at 300 $min^{-1}$ in the course of 30 seconds. The mixture is then treated as described in Example 1, affording a filter cake having a solids content of 34%. Analysis of an aqueous extract of this filter cake gives the following results:
pH: 12.4
Nickel content: 0.05 mg/l
Vanadium content: 0.1 mg/l
TTC value: +20%.

The filter cake is depositable as landfill.

COMPARISON 3

A filter cake is produced as described in Example 3, except that no $Ca(OH)_2$ is admixed into the carbon black water, affording a filter cake having a solids content of 31%. Aqueous extract analysis gives the following values:
pH: 8.5
Nickel content: 0.05 mg/l
Vanadium content: 130 mg/l
TTC value: −10%.

The filter cake is not depositable as landfill because of the high vanadium solubility.

EXAMPLE 4

Carbon black water having a carbon black content of 1.7% is stirred in a continuous flow 30 $m^3$ stirred vessel with 33 kg of 12% strength $Ca(OH)_2$ suspension (milk of lime) per $m^3$ of carbon black water, and the mixture is fed at a rate of 10 $m^3/h$ into a sieve belt press (belt width: 1 m).

The mixture of carbon black water and milk of lime is admixed in the pipeline with a 0.1% strength solution of an organic flocculant of 20% anionic modification at a dosage rate of 120 $l/m^3$. To obtain rapid and complete distribution of the fluocculant solution, a cone mixer built into the sludge line is used as a mechanical aid. This is followed by a floc aging process in a stirred vessel (flocculation reactor) at a stirrer speed of 15 $min^{-1}$. The average residence time in the stirred vessel is 2 minutes.

The lime treated and flocculated carbon black water is then subjected to two-stage dewatering on a sieve belt press.

The filter cake discharged from the press has an average solids content of 21%.

Analysis of aqueous extracts of these filter cakes reveals the following values:
pH: 12.1 to 12.3
Nickel content: 0.05 mg/l
Vanadium content: 0.5 mg/l
TTC value: +30 to +40%.

The filter cake is depositable as landfill.

We claim:

1. A process for treating wastewater having finely divided carbon black and ash which contain vanadium and/or nickel, the process consisting essentially of:
    (a) adding lime to adjust the pH of the wastewater to at least 11.8;
    (b) treating the wastewater with an organic flocculant;
    (c) flocculating the wastewater;
    (d) dewatering the wastewater to obtain a filter cake having vanadium and/or nickel present in non-elutable form(s); and
    (e) obtaining a distilled water extract of the filter cake;
wherein the amount of lime added to the wastewater is sufficient to obtain a pH of at least 11.8 in the distilled water extract.

2. The process of claim 1, wherein the amount of lime added is sufficient to obtain a pH greater than 12.0 in the distilled water extract.

3. The process of claim 1, wherein calcium hydroxide is added in a first stage to adjust the wastewater's pH to a value of from 11.9 to 12.1, and calcium hydroxide is added in a second stage in an amount of approximately 2 kg per $m^3$ of wastewater.

4. A process for treating a wastewater having finely divided carbon balck and ash which contain vanadium and/or nickel, wherein a filter cake is formed having non-elutable vanadium and/or nickel, the process consisting essentially of:
    (a) adding lime to adjust the pH of the wastewater to at least 11.8;
    (b) flocculating the wastewater with an organic flocculant; and
    (c) dewatering the wastewater to form the filter cake, wherein the amount of lime added to said wastewater is sufficient to obtain a pH of at least 11.8 in a distilled water extract of said filter cake.

5. The process of claim 4, wherein calcium hydroxide is added in an amount sufficient to obtain a pH of at least 12.0 in the distilled water extract of the filter cake.

6. The process of claim 5 wherein calcium hydroxide is added in an amount so that less than 0.5 mgs of vanadium and nickel are present per liter of distilled water extract.

7. The process of claim 4, wherein calcium hydroxide is added in a first stage to adjust the wastewater's pH to from 11.9 to 12.1, and calcium hydroxide is added in a second stage in an amount of approximately 2 kg per $m^3$ of wastewater.

* * * * *